(No Model.)
D. E. DARNELL.
Marking Out Sled for Agricultural Purposes.
No. 242,115. Patented May 31, 1881.
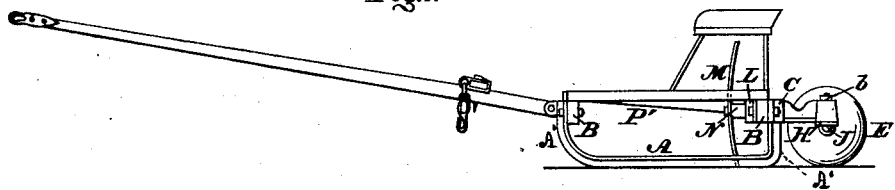
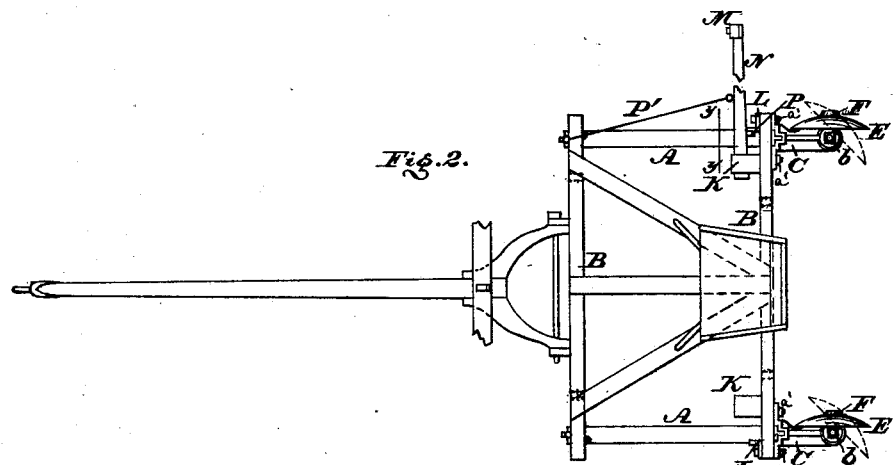
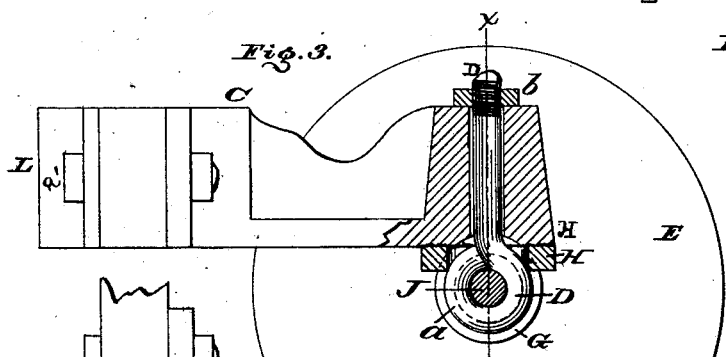
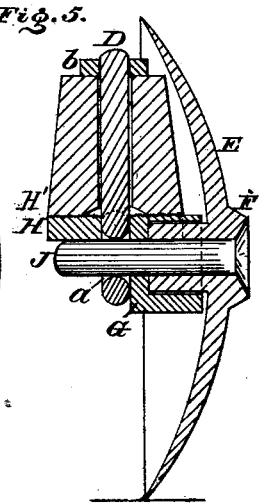
Witnesses:
L. Douville
W. F. Kircher
Inventor:
D. E. Darnell,
by John A. Biedersheim,
ATTORNEY.

UNITED STATES PATENT OFFICE.

DAVID E. DARNELL, OF MASONVILLE, NEW JERSEY.

MARKING-OUT SLED FOR AGRICULTURAL PURPOSES.

SPECIFICATION forming part of Letters Patent No. 242,115, dated May 31, 1881.

Application filed December 31, 1880. (No model.)

*To all whom it may concern:*

Be it known that I, DAVID E. DARNELL, a citizen of the United States, residing at Masonville, in the county of Burlington, State of New Jersey, have invented a new and useful Improvement in Marking-Out Sleds for Agricultural Purposes, which improvement is fully set forth in the following specification and accompanying drawings, in which—

Figure 1 is a side elevation of the marking-out sled embodying my invention. Fig. 2 is a top or plan view thereof. Fig. 3 is a side elevation, partly sectional, of a portion thereof. Fig. 4 is a top or plan view of a portion thereof. Fig. 5 is a transverse vertical section in line $x\ x$, Fig. 3. Fig. 6 is a transverse section in line $y\ y$, Fig. 2.

Similar letters of reference indicate corresponding parts in the several figures.

My invention consists of a marking-out sled having runners of T iron or metal, with connected plowshares, the horizontal limbs of the runners being above, so as to limit the degree of penetration of the runners, and the runners are connected to the beams of the sled, so as to be both vertically and laterally adjustable.

It also consists of combined means for adjusting the shares, protecting the axles thereof from dirt, and securely holding the axles, as will be hereinafter stated.

Referring to the drawings, A represents the runners, and B the transverse beams, of the frame or body to which the runners are attached. The runners, including their knees A', are formed of T iron or metal, the vertical limbs of which rest on or enter the ground, the degree of penetration being limited by the top horizontal limbs, and thus the sled may be drawn or moved with ease.

To the rear beam, B, are secured brackets C, which project horizontally rearward, their outer ends having vertical openings, through which are passed eyebolts D, the eyes *a* whereof are below.

E represents a rotary share on each side of the frame or body for forming the furrows, and F the hubs of said shares, each share having a hub on its opposite faces, thus providing a long or large bearing-surface for the shares on their axles. The inner hub is fitted in a cup, G, with which is formed, or to which is secured, a horizontally-arranged disk, H, through which the eye-bolt D is also passed, the eye *a* of the bolt D being below the said disk H.

J represents the axle of each share E, which is passed through the hubs F and eye *a* of the bolt D, and it will be seen that the shares rotate on the axles J. The inner hubs of the shares rotate within the cups G, and the axles are securely held and prevented from rotation by the eyes *a*, when the bolts D are tightened by the nuts *b* at their upper ends. The axles J have heads similar to bolts, and when said heads are worn by the outer hubs the axles may be driven in, thus preventing lost motion and irregularity of rotation of the shares. The cups G encircle the inner hubs of the shares, whereby dirt is prevented reaching the axles.

It will also be seen that the bolts D connect the shares to the sled, and by loosening the nuts *b* the shares may be adjusted so as to present more or less of their faces to the ground, and thus increase or decrease the width of the furrow. When the adjustment of the share is accomplished the nuts *b* are tightened, and when the sled is drawn forward the furrows are made.

The contiguous portions of the disks H and disk-like portions H' of the brackets C are serrated or roughened, so as to be locked, whereby the accidental shifting of the shares is prevented.

The runners are bent so as to form knees, the front ones whereof are adjustably bolted to the front beam, B, and the rear ones are passed freely through vertical openings in forward portions of the brackets C, the latter being adjustably bolted to the rear beam, B, the beams having a series of perforations for the bolts of the runners and brackets, so that the runners, and consequently the shares, may be set nearer to or farther from each other.

It will be seen that when the bolts which secure the brackets to the beams are tightened the rear ends of the runners are clamped to the beam and thereby securely held. By this provision, also, when the aforesaid bolts are loosened said rear ends of the runners may be raised and lowered in the brackets, and the degree of penetration of the shares into the ground and depth of the furrows accordingly regulated. When the adjustment is accomplished the bolts are tightened and the parts retain their proper positions.

The frame or body of the sled is properly braced or strengthened, and provided with a suitable seat for the driver.

Attached to each side of the rear beam, B, is an eye, K, and vertical plate L, the opening of the eye extending horizontally.

M represents a marker, which is attached to the outer end of a beam or rod N, whose inner end is adapted to enter either of the eyes K. Adjacent to said inner end is a rearwardly-projecting pin, P, which is adapted to bear against the inner face of either of the plates L.

It will be seen that when the beam or rod N is fitted to the eye K the pin P and plate L prevent lateral disengagement of the beam or rod from the beam of the frame or body, the connection being increased by a brace-rod, P', attached to the beam N and the front beam, B, of the frame or body, or the front end of one of the runners. When the brace-rod P' is disconnected the beam N may be raised. This clears the pin P from the plate L, and said beam may be withdrawn from the eye K and thus disengaged, it being noticed that the marking device is applicable to either side of the beam of the frame or body.

Having thus described my invention, what I claim as new, and desire to secure by Letters Patent, is—

1. The beams B and the runners A, with knees A', each runner and knee being continuous and formed of T-iron, the horizontal limbs whereof are above, in combination with the plowshares, the runners being both vertically and laterally adjustably connected to the beams B, all parts being constructed and operating substantially as and for the purpose set forth.

2. The riding-sled, formed of transverse beams B and runners A of T-metal, in combination with the brackets C, carrying plowshares, the rear knees of the runners passing through the brackets and clamped to the beams by the bolts a' of the brackets, substantially as and for the purpose set forth.

3. The brackets C, with rear disk-like portions, H', the disks H having cups G, the shares E having hubs on their inner faces, the axle-pins J and vertical eyebolts D, combined as described, the disks and disk-like portions H H' being contiguous, and the disks being rotatable on the disk portions, and the cups G formed with said disks H, all constructed and operating as and for the purpose set forth.

4. The riding-sled with runners of T-metal, the brackets C, with the rear knees of the runners passed through them, the disks H, shares E, pins J, and bolts D, combined and operating as described, and forming an improvement in marking-out sleds, as stated.

5. The marker rod or beam N, provided with the pin P, and the frame or body, having the eye K and plate L, substantially as and for the purpose set forth.

DAVID E. DARNELL.

Witnesses:
JOHN A. WIEDERSHEIM,
A. P. GRANT.